United States Patent Office 3,326,927
Patented June 20, 1967

3,326,927
CERTAIN PYRIDINIUM AND QUATERNARY AMMONIUM DERIVATIVES OF PHENOLIC-POLYOXY ALKYLENE COMPOUNDS AND A METHOD FOR THEIR PREPARATION
Hilmer L. Aamoth, Lake Jackson, Tex., assignor to The Dow Chemical Company, Midland, Mich., a corporation of Delaware
No Drawing. Filed May 18, 1964, Ser. No. 368,391
14 Claims. (Cl. 260—297)

This invention relates to new compositions of matter and to methods of preparing such compositions. More particularly, the present invention relates to oxyalkylene cationic surfactant compounds which contain one aryl group and to methods of preparing such surfactant compounds.

Quaternary ammonium compounds derived from 1,2-dihydroxy-3-aminopropane are known. Such compounds are disclosed, for example, in British Patent 704,014. However, these compounds do not contain polyoxyalkylene groups within the molecule and are not suitable for the ready formation of salts of strong inorganic acids. Other classes of quaternary ammonium salts are disclosed in U.S. Patent 2,772,310 to Morris, U.S. 2,775,604 to Zech, U.S. 3,028,299 to Winicov et al., U.S. 2,547,965 to Olin, U.S. 3,102,912 to Neracher et al. and U.S. 3,102,839 also to Neracher et al. Compounds disclosed in these patents, however, either fail to have oxyalkylene groups within the molecule or else contain oxyalkylene groups which do not separate the quaternized nitrogen atom from the aromatic nucleus of the molecule (i.e., the oxyalkylene groups are "dangling" with respect to the nitrogen atom and the aromatic nucleus).

The compounds of the invention may be prepared according to the following general equations:

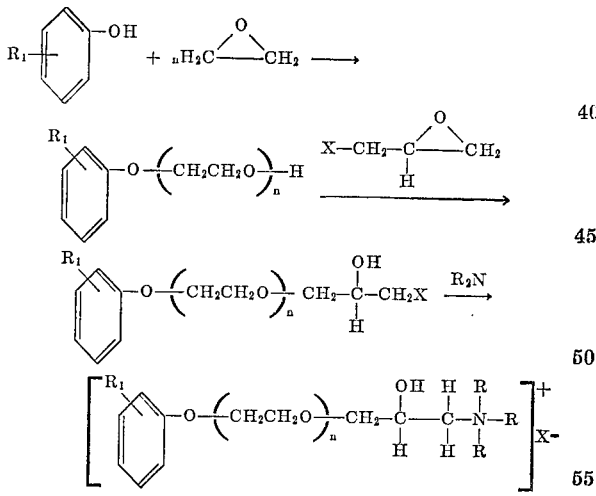

wherein $R_1$ represents an alkyl group of from 8 to 16 carbon atoms, $n$ is an integer of from 2 to 50 (preferably from about 10 to 50), X is a halogen atom (Cl, Br, F, I and preferably, Cl or Br) and each R group may be an aryl group of up to 20 carbon atoms such as a phenyl, tolyl, xyly, duryl, phenethyl or naphthyl group or an alkyl group of up to about 20 carbon atoms; for example, a lower alkyl group such as methyl, ethyl, n-propyl, i-propyl, n-butyl, sec.-butyl, tert.-butyl and i-butyl or a higher alkyl group such as the straight and branched chain octyl, nonyl, decyl, undecyl, dodecyl, tridecyl, tetradecyl, pentadecyl, hexadecyl, heptadecyl octadecyl nonyldecyl and eicosyl radicals. Each R may also be a hydroxyalkyl group of up to 10 carbon atoms ($HOC_kH_{2k}$—, where $k$ is an integer of from 1 to 10 and the hydroxyl group is attached to any carbon atom of the group).

Typical alkanolamines include the dialkylaminoalkanols such as dimethylaminoethanol, diethylaminopropanol and N-methyl-N-n-butylaminobutanol, etc. $R_3N$ may also be a heterocyclic amine such as pyridine. $R_1$ is preferably an alkyl group of from 8 to 12 carbon atoms such as the normal and branched octyl, nonyl, decyl, undecyl and dodecyl radicals. When $R_1$ is a nonyl group, branched nonyl groups derived from tripropylene are preferred.

As shown by these equations, the compounds of the present invention are prepared by reacting an alkylphenol with from 2 to 50 moles of ethylene oxide to form the resulting oxyalkylated product, followed by reaction of this oxyalkylated product with one mole of epihalohydrin per mole of oxyalkylated product to form the corresponding halohydrin, and then quaternizing this halohydrin with any tertiary amine (including heterocyclic tertiary amines and alkanolamines) of from 3 to 60 carbon atoms.

In the compounds of the present invention, the quaternized nitrogen atom is separated from the alkaryl nucleus by a carbon-oxygen chain which contains at least seven carbon atoms and at least three oxygen atoms. The quaternary ammonium salts are further characterized by the presence of a hydroxyl group linked to a beta carbon atom (with respect to the nitrogen atom). This unique combination of structural features in the molecule imparts excellent fabric softening properties to the compounds of the invention when used for the treatment of cotton, wool and synthetic woven fibers. In addition, the compounds are generally excellent surfactants. Compounds prepared from only two moles of ethylene oxide have germicidal properties, although the surfactant properties are decreased in comparison with those compounds which contain more polyoxyethylene groups.

The following examples are submitted for the purpose of illustration only and are not to be construed as limiting the scope of the invention in any way.

EXAMPLE I

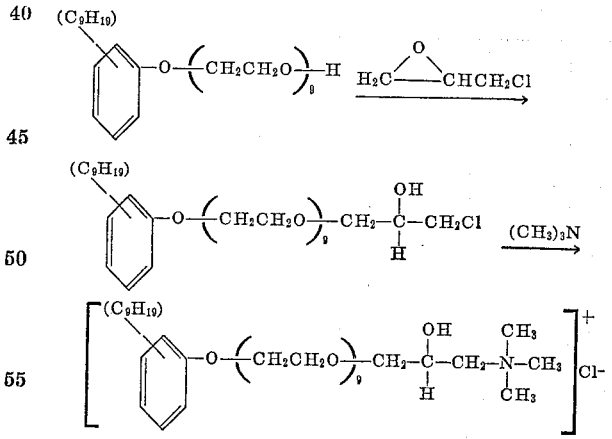

A one hundred eighty gram sample of the reaction product of one mole of nonylphenol and nine moles of ethylene oxide (commercial product) was mixed in a reflux flask with 30 milliliters of epichlorohydrin and 8 drops of $BF_3 \cdot (CH_3CH_2)_2O$ (boron trifluoride etherate, 48 percent $BF_3$) catalyst was added. The mixture was stirred and heated to 80°–95° C. The epichlorohydrin was consumed in from ½ to ¾ of an hour. The resulting chlorohydrin was then mixed with 50 grams of trimethylamine (a 25 percent by weight solution in water). The reaction was slow at room temperature but the chlorohydrin was rapidly converted to the quaternary ammonium derivative ($C_{39}H_{74}ClNO_{11}$) with mild heat (40°–60° C.).

Confirmation of the quaternary was obtained by adding to a water solution of the product a quantity of dodecylbenzene sulfonate and separately, sodium polystyrene sulfonate. In both cases, an immediate reaction occurred to produce a white precipitate. Further, after stripping off any excess amine under vacuum, a weighed portion was passed through a basic ion exchange column and the effluent titrated with N/10 HCl. The titration curve is that of a typical strong base. This titration shows the presence of 0.535 meq. of quaternary per gram of product, or 41 percent by weight quaternary product.

EXAMPLES II–VIII

Similar surfactant quaternary ammonium products are obtained when other epihalohydrins (such as epibromohydrin) are substituted in place of the epichlorohydrin reactant. By variation of the number of moles of ethylene oxide and quaternizing the halohydrin intermediate with different tertiary amines (including alkanolamines), other exemplary surfactants are obtained. The results of several experiments (conducted in accordance with the general method of Example I) are summarized in Table 1.

I claim as my invention:
1. A compound of the formula

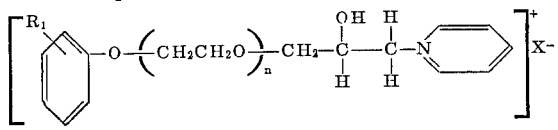

wherein:
(a) $R_1$ is an alkyl group of from 8 to 16 carbon atoms,
(b) $n$ is an integer of from 2 to 50, and
(c) X is a halogen atom.

2. A compound of the formula

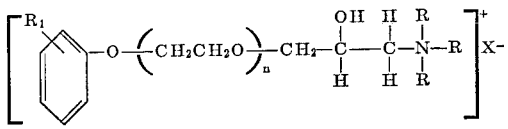

wherein:
(a) $R_1$ is an alkyl group of from 8 to 16 carbon atoms,
(b) $n$ is an integer of from 2 to 50,
(c) X is a halogen atom, and

TABLE 1

| Ex. No. | Moles of ethylene oxide per mole of alkylphenol | Alkyl-phenol | Epihalo-hydrin | Amine | Quaternary ammonium surfactant compound* | Empirical formula |
|---|---|---|---|---|---|---|
| II | 2 | Nonyl phenol. | Epichloro-hydrin. | Trimethyl-amine. | 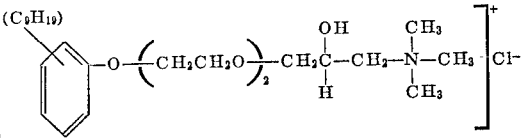 | $C_{25}H_{46}ClNO_4$ |
| III | 4 | ...do... | ...do... | ...do... | 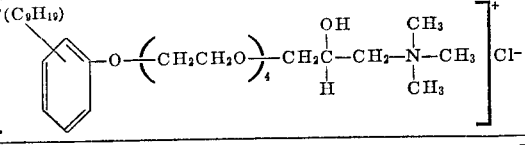 | $C_{29}H_{54}ClNO_6$ |
| IV | 4 | ...do... | ...do... | N,N-di-methyl-benzyl-amine. | 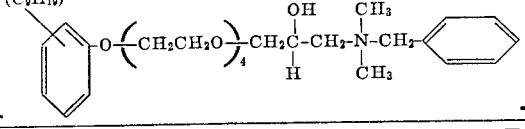 | $C_{35}H_{58}ClNO_6$ |
| V | 9 | ...do... | ...do... | Pyridine | 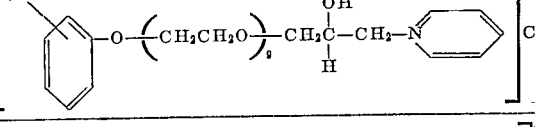 | $C_{41}H_{70}ClNO_{11}$ |
| VI | 9 | ...do... | ...do... | N,N-di-methyl-benzyl-amine. | 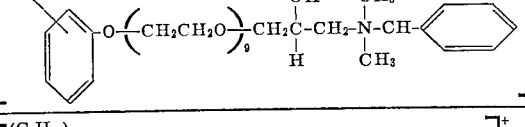 | $C_{45}H_{78}ClNO_{11}$ |
| VII | 9 | ...do... | ...do... | N,N-di methyl-amino-ethanol. | 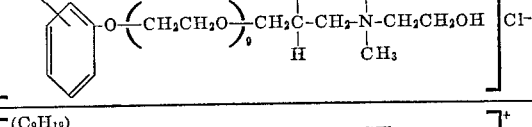 | $C_{40}H_{76}ClNO_{12}$ |
| VIII | 4 | ...do... | ...do... | ...do... | 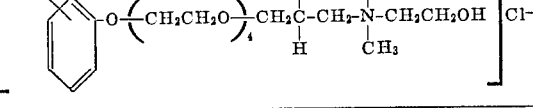 | $C_{30}H_{56}ClNO_7$ |

*In all formulas, unsubstituted carbon atoms of the aromatic nucleus are bound to hydrogen atoms.

(d) each R is independently selected from the group consisting of a hydroxyalkyl group of from 1 to 4 carbon atoms, an alkyl group of from 1 to 4 carbon atoms and an aryl group of from 6 to 10 carbon atoms.

3. A compound of the formula

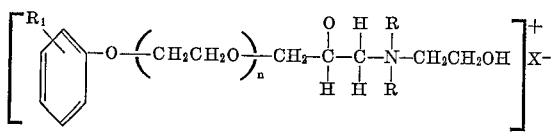

wherein:
(a) $R_1$ is an alkyl group of from 8 to 16 carbon atoms,
(b) $n$ is an integer of from 2 to 50,
(c) X is a halogen atom, and
(d) each R is an alkyl group of from 1 to 4 carbon atoms.

4. A compound of the formula

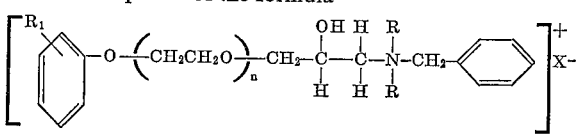

wherein:
(a) $R_1$ is an alkyl group of from 8 to 16 carbon atoms,
(b) $n$ is an integer of from 2 to 50,
(c) X is a halogen atom, and
(d) each R is an alkyl group of from 1 to 4 carbon atoms.

5. The compound:

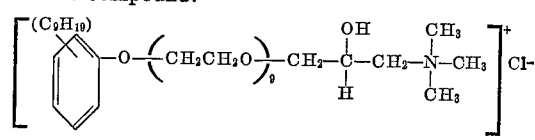

6. The compound:

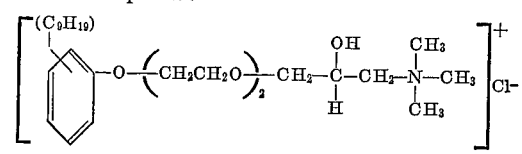

7. The compound:

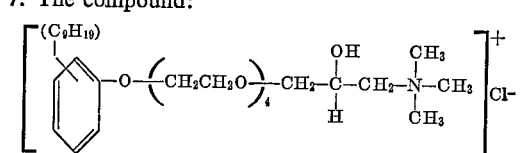

8. The compound:

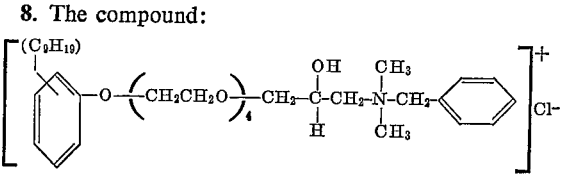

9. The compound:

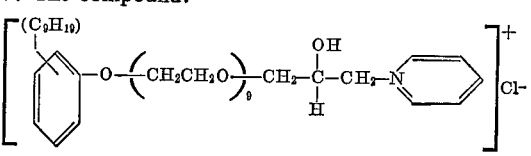

10. The compound:

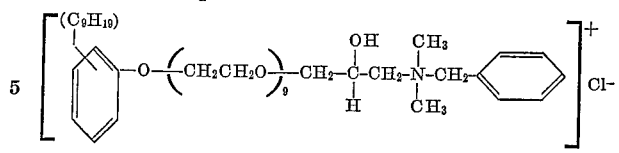

11. The compound:

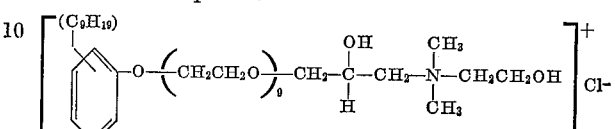

12. The compound:

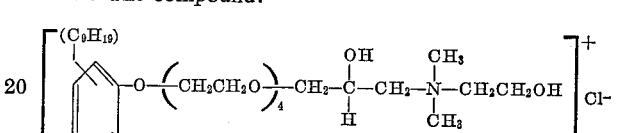

13. A compound of the formula

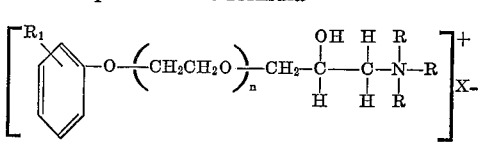

wherein:
(a) $R_1$ is an alkyl group of from 8 to 12 carbon atoms,
(b) $n$ is an integer of from 2 to 9,
(c) X is a halogen atom, and
(d) each R is independently selected from the group consisting of a hydroxyalkyl group of from 1 to 4 carbon atoms, an alkyl group of from 1 to 4 carbon atoms and an aryl group of from 6 to 10 carbon atoms.

14. A compound of the formula

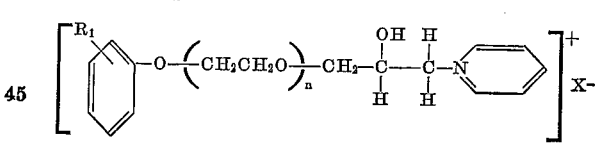

wherein:
(a) $R_1$ is an alkyl group of from 8 to 12 carbon atoms,
(b) $n$ is an integer of from 2 to 9, and
(c) X is a halogen atom.

References Cited
UNITED STATES PATENTS
2,775,604   12/1956   Zech _____ 260—404.5

OTHER REFERENCES
Brassler et al., Chem. Abstracts, vol. 55, par. 13, 868 (1961).
Devtsche-Gold and Silber, Chem. Abstracts, vol. 53, par. 10, 811 (1959).

WALTER A. MODANCE, *Primary Examiner.*
ALAN L. ROTMAN, *Assistant Examiner.*

UNITED STATES PATENT OFFICE
CERTIFICATE OF CORRECTION

Patent No. 3,326,927                                   June 20, 1967

Hilmer L. Aamoth

It is hereby certified that error appears in the above numbered patent requiring correction and that the said Letters Patent should read as corrected below.

Column 1, lines 47 to 50, the formula should appear as shown below instead of as in the patent:

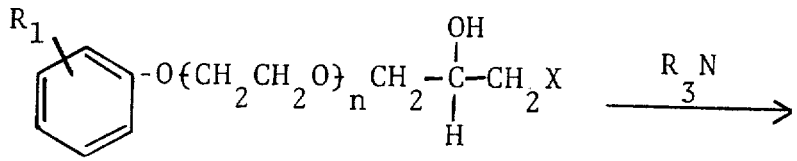

line 62, for "xyly" read -- xylyl --; line 68, for "heptadecyl" read -- heptadecyl, --; column 5, lines 7 to 14, the formula should appear as shown below instead of as in the patent:

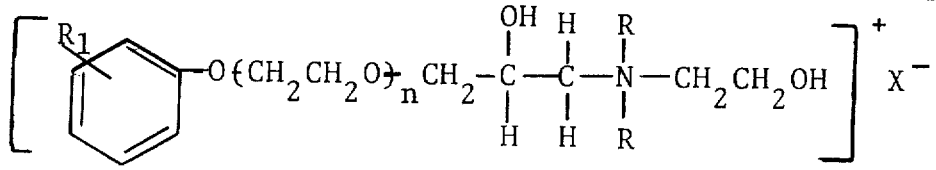

Signed and sealed this 18th day of June 1968.

(SEAL)
Attest:

EDWARD M. FLETCHER, JR.                      EDWARD J. BRENNER
Attesting Officer                            Commissioner of Patents